US012160041B2

(12) United States Patent
Abushakra et al.

(10) Patent No.: US 12,160,041 B2
(45) Date of Patent: Dec. 3, 2024

(54) MINIATURIZED REFLECTOR ANTENNA

(71) Applicant: The Board of Trustees of The University of Alabama, Tuscaloosa, AL (US)

(72) Inventors: Feras Abushakra, Tuscaloosa, AL (US); Seong Heon Jeong, Tuscaloosa, AL (US); Omar Asfar, Irbid (JO)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 17/733,019

(22) Filed: Apr. 29, 2022

(65) Prior Publication Data

US 2022/0352639 A1 Nov. 3, 2022

Related U.S. Application Data

(60) Provisional application No. 63/182,208, filed on Apr. 30, 2021.

(51) Int. Cl.
*H01Q 13/08* (2006.01)
*H01Q 5/25* (2015.01)
*H01Q 19/17* (2006.01)

(52) U.S. Cl.
CPC ............... *H01Q 13/08* (2013.01); *H01Q 5/25* (2015.01); *H01Q 19/17* (2013.01)

(58) Field of Classification Search
CPC .. H01P 3/16; H01Q 5/47; H01Q 13/02–0291; H01Q 9/0485; H01Q 17/015483
USPC .......................................................... 343/835
See application file for complete search history.

(56) References Cited

U.S. PATENT DOCUMENTS

| | | | | |
|---|---|---|---|---|
| 4,463,329 | A * | 7/1984 | Suzuki | H01P 11/006 333/241 |
| 4,468,672 | A * | 8/1984 | Dragone | H01Q 19/08 333/240 |
| 9,859,623 | B2 * | 1/2018 | Bosshard | H01Q 21/064 |
| 10,727,607 | B2 * | 7/2020 | Luo | H01Q 13/02 |
| 10,879,578 | B2 * | 12/2020 | Ahirwar | H01P 3/06 |
| 2021/0344097 | A1 * | 11/2021 | Hiller | H01P 3/06 |
| 2022/0407206 | A1 * | 12/2022 | Yoshimoto | C08F 14/26 |

FOREIGN PATENT DOCUMENTS

| | | | | |
|---|---|---|---|---|
| WO | WO-2017066654 A1 * | 4/2017 | | H01P 1/16 |
| WO | WO-2017171358 A1 * | 10/2017 | | H01P 1/2138 |

* cited by examiner

*Primary Examiner* — Hoang V Nguyen
*Assistant Examiner* — Brandon Sean Woods
(74) *Attorney, Agent, or Firm* — Meunier Carlin & Curfman LLC

(57) ABSTRACT

A multi-core dielectric circular waveguide (MCDCW) is described. A hybrid mode excitation for multi-core dielectric filled circular waveguide fed parabolic antenna is also described. A multi-core dielectric circular waveguide with four cylinders of different relative permittivity ($\in_r$) inside each other is used to generate the hybrid mode ($HE_{11}$) directly without need for coupling $TE_{11}$ and $TM_{11}$ modes as in prior art corrugated waveguide feeders. This mode is preferable to be used as operating mode to feed the reflector. Four concentric cylinders of different relative permittivity $\in_r$ are used as an example.

14 Claims, 14 Drawing Sheets

400

MINIATURIZED REFLECTOR ANTENNA

CROSS-REFERENCE TO RELATED APPLICATIONS

This application claims the benefit of priority to U.S. Provisional Patent Application No. 63/182,208, filed on Apr. 30, 2021, entitled "MINIATURIZED REFLECTOR ANTENNA" the contents of which are hereby incorporated by reference in their entirety.

BACKGROUND

Reflector antennas are widely used in many microwave communication applications, such as satellite communication, radio astronomy, and radar. Reflector antennas have many advantages such as high efficiency, narrow pencil beam, and high gain. Many techniques have been used to feed a reflector antenna such as a horn antenna, a dipole array, a spiral antenna, and an open end waveguide. Conventional approaches have many disadvantages and drawbacks including size, cost, and complexity.

It is with respect to these and other considerations that the various aspects and embodiments of the present disclosure are presented.

SUMMARY

A multi-core dielectric circular waveguide (MCDCW) is described. A hybrid mode excitation for a multi-core dielectric filled circular waveguide fed parabolic antenna is also described.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
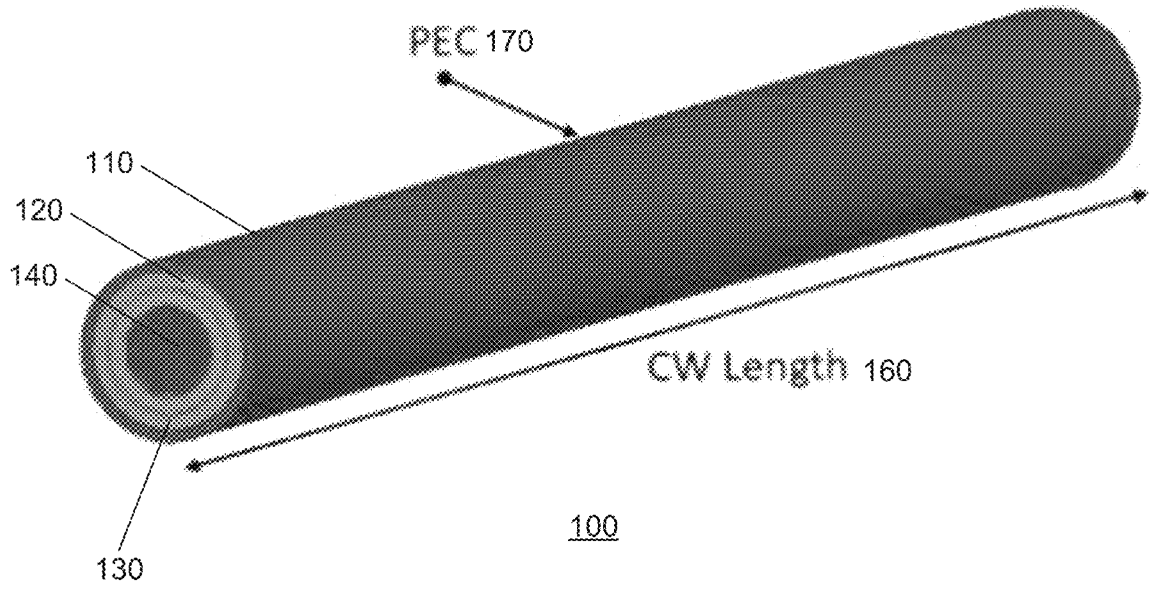
FIG. 1 is a perspective view illustration of an implementation of a multi-core dielectric circular waveguide.

The description is not to be taken in a limiting sense, but is made merely for the purpose of illustrating the general principles of the invention, since the scope of the invention is best defined by the appended claims.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Various inventive features are described herein that can each be used independently of one another or in combination with other features.

Reflector antennas are widely used in numerous applications including satellite, radio, and microwave point-to-point links. One of the main parts of any microwave point-to-point link is the transmitting and receiving antenna. The point-to-point microwave links are moving towards new generations, where it could transfer the same amount of data rate as fiber optics especially after the prevalence of MIMO (multiple-input multiple-output) technology in microwave links.

A multi-core dielectric circular waveguide (MCDCW) is described. A hybrid mode excitation for multi-core dielectric filled circular waveguide fed parabolic antenna is also described. The hybrid mode ($HE_{11}$) which, in prior art embodiments, can be generated from coupling both the $TE_{11}$ and $TM_{11}$ modes using corrugated structures, is preferable to be used as operating mode to feed the reflector. Among many modes, the $HE_{11}$ mode has many features that result in a symmetrical radiation pattern, a uniform distribution, and a low cross polarization level. Multiple dielectric materials are used inside the metallic waveguide to generate the hybrid mode ($HE_{11}$) with smaller size and more focused beam.

As described further herein, hybrid mode generation is attained directly without the need for the mode conversion mechanisms used in prior art devices. Analysis and simulation show the modes inside the waveguide. Moreover, different feeding methods may be used, including a tapered air-filled waveguide, a metallic patch, and an L-probe. Thus, many feeding methods can be used to excite the waveguide. Size reduction is also achieved.

Thus, the multi-core dielectric-filled cylindrical waveguide and feeding methods described herein miniaturize a reflector antenna substantially, allowing affordable, small, lightweight, durable, and high-gain antenna.

Figure 2:
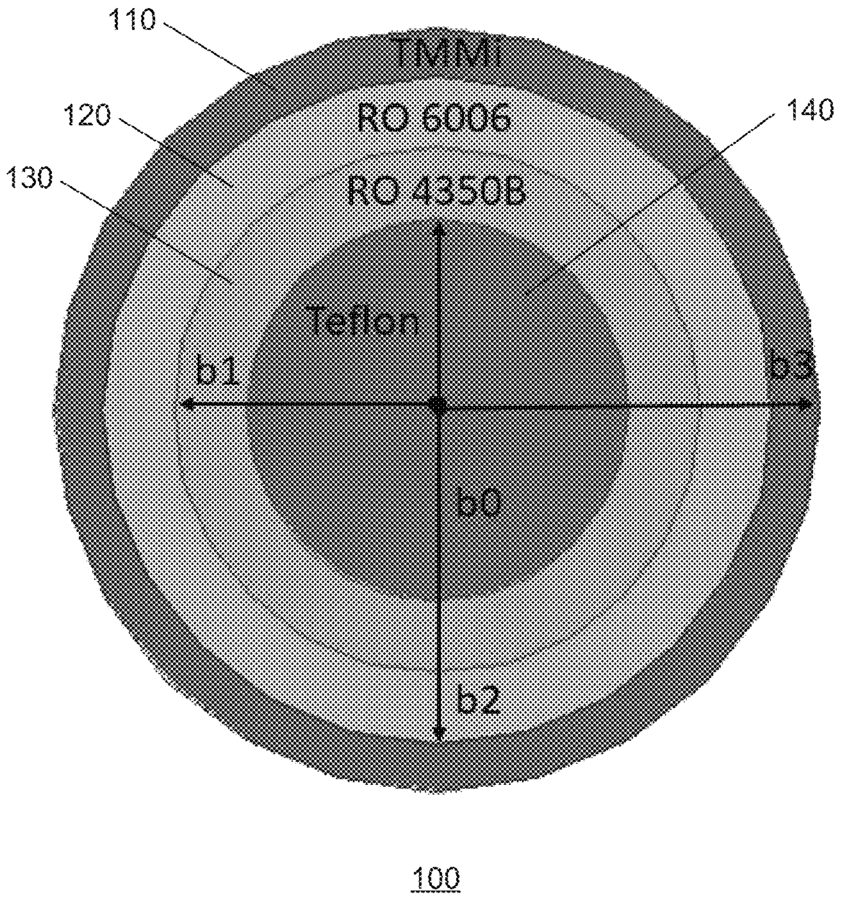
FIG. 2 is a cross section view illustration of an implementation of a multi-core dielectric circular waveguide.

FIG. 1 is a perspective view illustration of an implementation of a multi-core dielectric circular waveguide (MCDCW) 100, and FIG. 2 is a cross section view illustration of an implementation of the multi-core dielectric circular waveguide 100.

A multi-core dielectric circular waveguide with four cylinders 110, 120, 130, 140 of different relative permittivity ($\in r$) inside each other is used to generate the hybrid mode ($HE_{11}$) which is preferable to be used as operating mode to feed the reflector antenna. Four concentric cylinders 110, 120, 130, 140 of different relative permittivity $\in_r$ are used as an example.

Among many modes, the $HE_{11}$ mode has many features such as being symmetrical, having uniform distribution, and having a low cross polarization level.

Different dielectric materials can be used to fill the circular waveguide 100, which will reduce the overall size of the feeder and reduce the main beam of the reflector itself.

In an implementation, the materials used to simulate the waveguide 100 are: TMMi with ($\in_{r3}$=9.8) for the cylinder 110, Roger 6006 ($\in_{r2}$=6.15) for the cylinder 120, Roger 4350B ($\in_{r1}$=3.66) for the cylinder 130, and Teflon ($\in_{r0}$=2.1) for the cylinder 140. In the example of FIGS. 1 and 2, the dimensions are $b_3$, $b_2$, $b_1$ and $b_0$ which corresponds to 9, 8, 7, and 6 mm, respectively. The circular waveguide (CW) length 160 is 95 mm. The multiple excitation methods described further herein are distinctive features.

The outer side surface of the circular waveguide 100 is a perfect conductor (PEC) 170. The value of ($\in_r$) for each layer decreases from ($\in_{r3}$) in the outer layer between $b_3$ and $b_2$ to the lowest relative permittivity ($\in_{r0}$) in the core of the radius $b_0$.

The distribution of values of dielectric constant helps decrease the reflection coefficient at the input of the waveguide 100. Also, higher dielectric constants may be used to decrease the size as desired. In other words, the gradual variation of the values of the relative permittivity is useful in decreasing the reflection coefficient at the input of the waveguide 100. Also, higher relative permittivity may be used in order to decrease the feeder and reflector antenna size.

Figure 3:
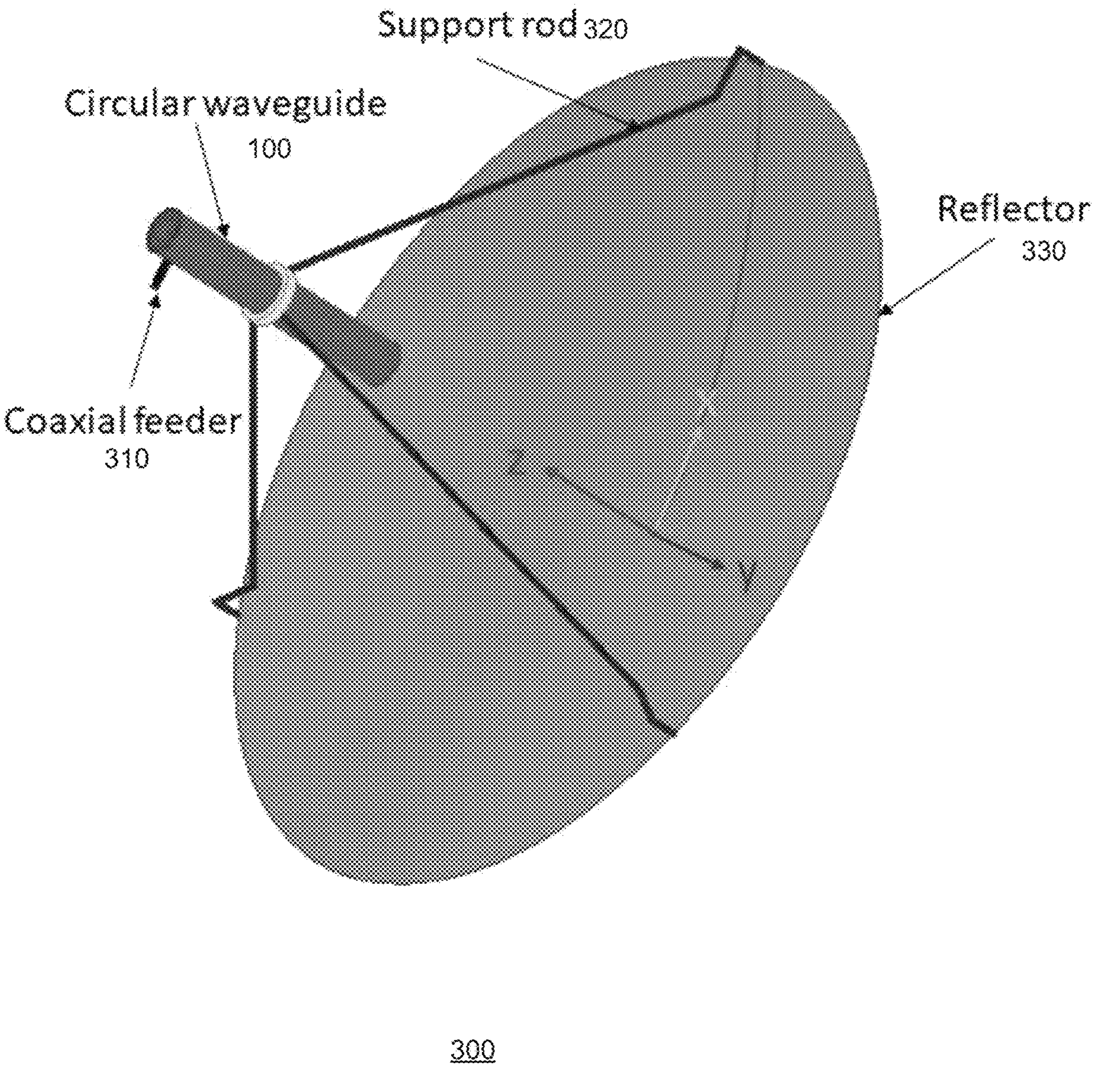
FIG. 3 is an illustration of an implementation of a multi-core dielectric circular waveguide system fed reflector antenna.

One distinctive feature is the extremely small form factor due to the waveguide feeder. FIG. 3 is an illustration of an implementation of a multi-core dielectric circular waveguide system 300. The system 300 comprises a circular waveguide 100 (such as that described with respect to FIGS. 1 and 2, for example), a coaxial feeder 310, a support rod 320, and a reflector 330. The feeder 310 is very small in its cross section compared to an air-filled waveguide or horn antenna feeders especially at lower frequencies. The size of the feeder 310 could be controlled by changing the dielectric constant of the materials in the different layers of the circular waveguide 100.

This geometry offers better environmental protection when compared with the traditional horn antenna that requires to be covered by a special cover of strong plastic to prevent water and dust from entering inside the feeder aperture.

The hybrid mode generation in this design geometry is easier compared with the corrugated waveguide or other designs.

This approach significantly reduces the overall size of the reflector antenna due to reduction of the cross section of the feeder 310. It is also cost effective and easy to maintain (i.e., ease of maintenance).

Figure 4:
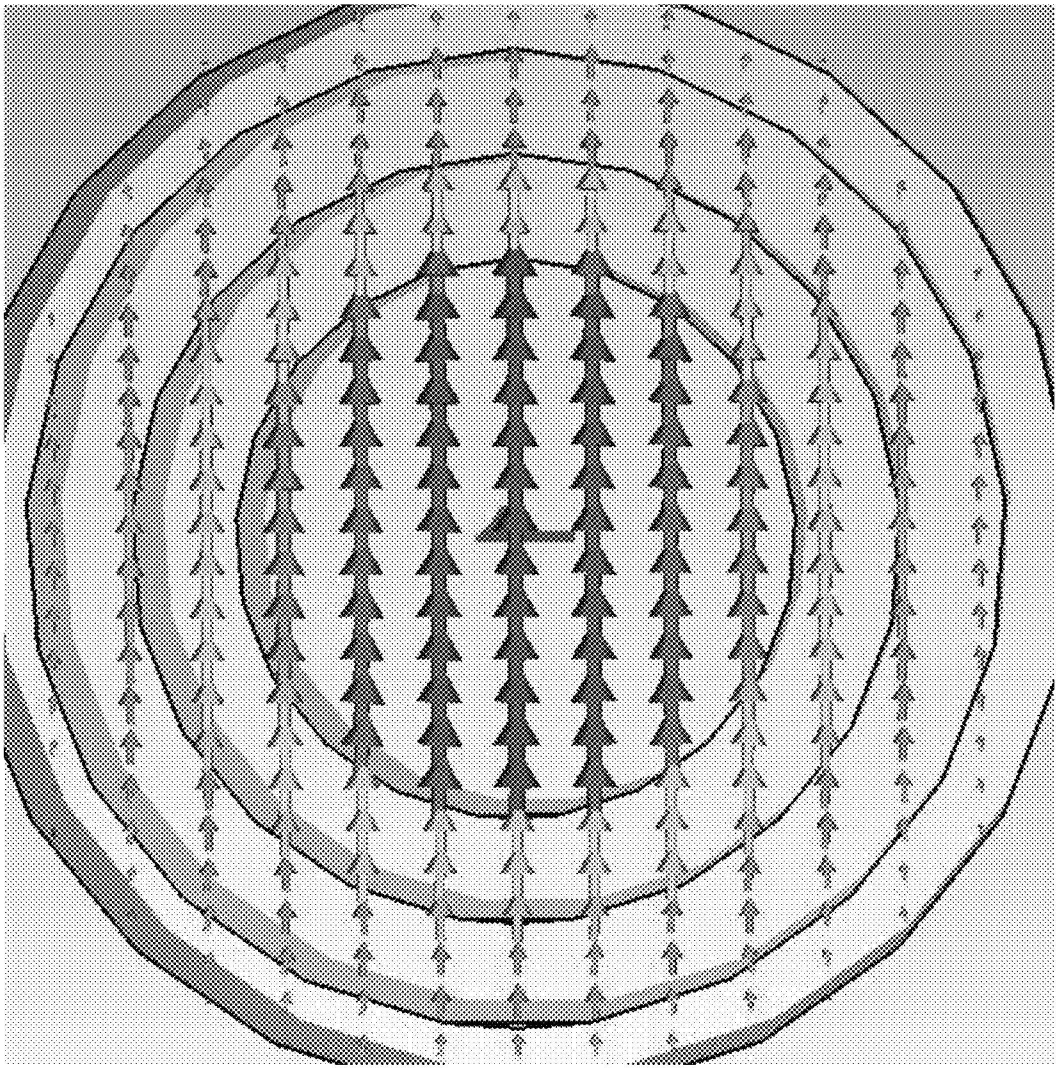
FIG. 4 is an illustration of an example $HE_{11}$ electric field distribution.

Another distinctive feature is the hybrid mode. FIG. 4 is an illustration of an example $HE_{11}$ electric field distribution 400. The hybrid mode is the dominant mode in this geometry, which propagates before the $TM_{11}$ mode or the $TE_{11}$. The hybrid mode is preferable, as it gives more symmetry in the radiation pattern. Unlike the traditional air-filled circular waveguide that has $TE_{11}$ as dominant mode followed by the $TM_{11}$ mode, the hybrid mode is the dominant mode with lowest cutoff frequency and is followed by the $TM_{11}$ mode, which in this design leads the $TE_{11}$ mode.

The number of the internal cylindrical layers of the dielectric waveguide 100 can be increased for better matching in some implementations. Moreover, the frequency separation between the hybrid mode and the next mode could be controlled based on the selected materials.

Figure 5:
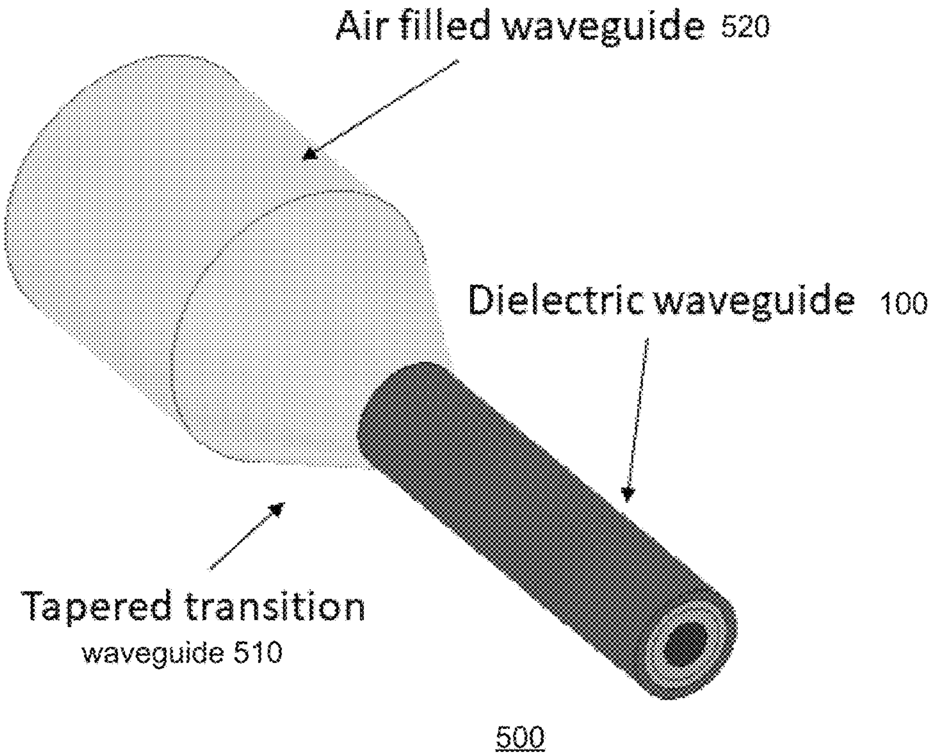
FIG. 5 is an illustration of an implementation of a multi-core dielectric circular waveguide system.
Figure 6:
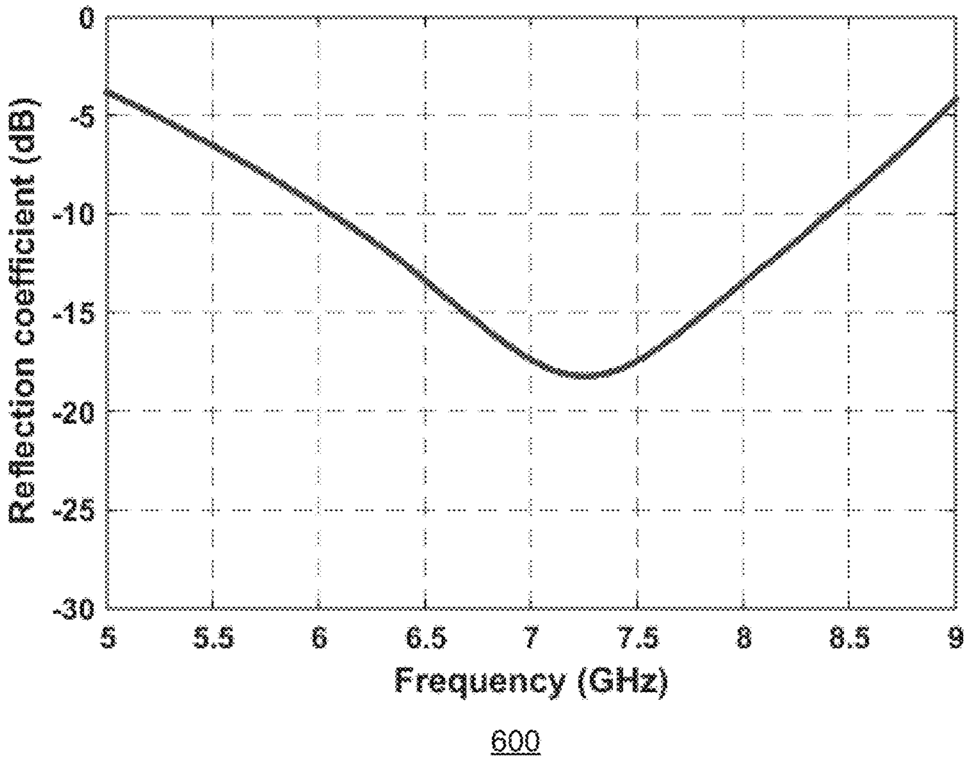
FIG. 6 is a chart of reflection coefficient vs. frequency for an implementation of a multi-core dielectric circular waveguide.

Another distinctive feature are the various different feeding methods. In an implementation, aperture coupled feeding is used. FIG. 5 is an illustration of an implementation of a multi-core dielectric circular waveguide system 500 that uses aperture coupled feeding. FIG. 6 is a chart 600 of reflection coefficient vs. frequency for an implementation of the multi-core dielectric circular waveguide 500.

The system 500 comprises a multi-core dielectric circular waveguide 100 with a tapered transition waveguide 510 to an air filled waveguide 520. A small section of a tapered transition waveguide 510 may have a circular aperture (or rectangular aperture for multi-layer rectangular waveguide) and attached to excite the waveguide 100. An aperture is created at the interface between the tapered transition waveguide 510 and the multi-core dielectric circular waveguide 100.

Other feeding methods include coaxial L-probe feeding and metallic patch feeding.

Figure 7:
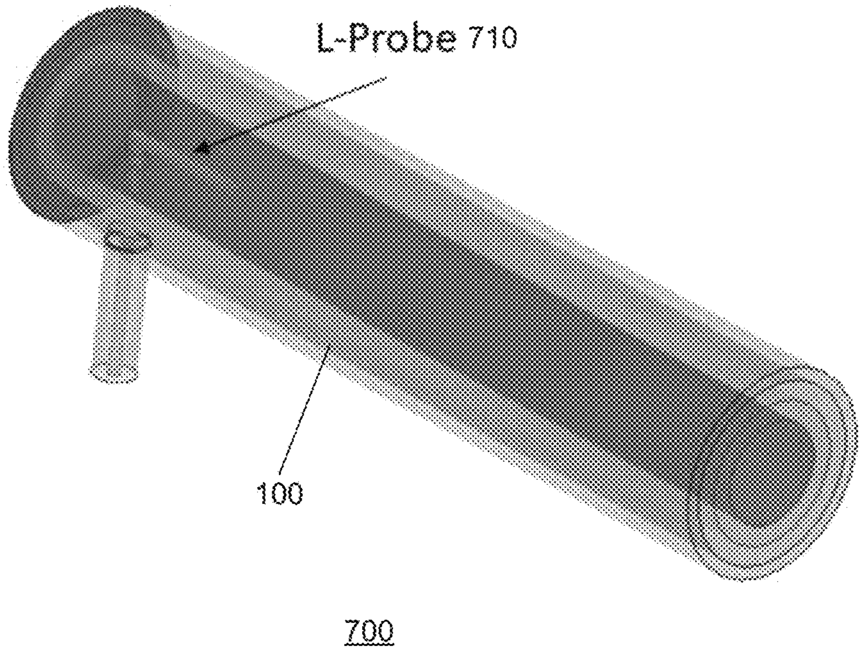
FIG. 7 is an illustration of an implementation of a multi-core dielectric circular waveguide with L-probe feeding.

FIG. 7 is an illustration of an implementation of a multi-core dielectric circular waveguide 700 with an L-shaped coaxial probe 710 feeding to a multi-core dielectric circular waveguide 100. With coaxial L-shaped probe feeding, there is a straight single strip from a coaxial cable that can be inserted through a hole in the multi-layer waveguide 700. An L-shaped coaxial probe 710 with conductive wire can be positioned in the inner most dielectric cylinder of the multi-core dielectric circular waveguide 100.

The near end of the waveguide 100 to the probe 710 is closed by perfect conductor to direct the wave toward the other side. The end of the waveguide 100 close to the L-shaped coaxial probe 710 is short-circuited.

Figure 8:
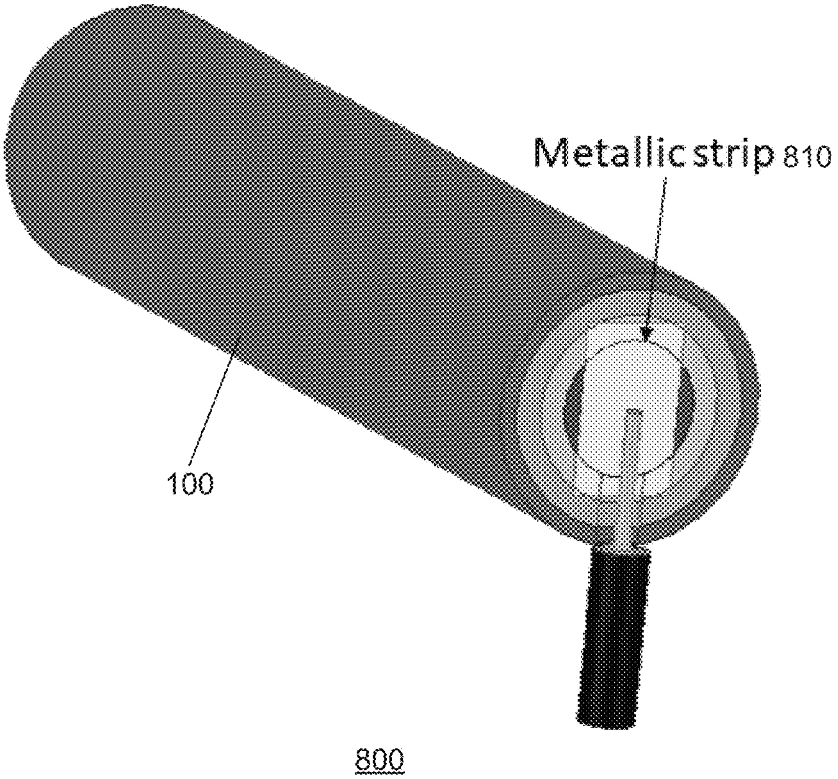
FIG. 8 is an illustration of an implementation of a multi-core dielectric circular waveguide with metallic patch feeding.

FIG. 8 is an illustration of an implementation of a multi-core dielectric circular waveguide 800 with metallic patch feeding, that comprises a multi-core dielectric circular waveguide 100 and a metallic strip 810. With metallic patch feeding, a conducting patch can also be extended from a coaxial cable and attached to one end of the multi-core dielectric circular waveguide 100. The patch may be circular or rectangular. The patch may cover one of the dielectric layers of the multi-core dielectric circular waveguide 100 to achieve better matching.

As theoretical analysis of hybrid modes is complex, derivation of cutoff frequencies of TE and TM modes is described as a verification of the simulations.

To determine the cut-off frequency of the $TM_{11}$ mode, the boundary conditions should be satisfied to allow the wave to propagate. Cylindrical coordinates were used where p axis is the radial direction on the cross section of MCDCW, while z axis is the direction of wave propagation along the MCDCW. The tangential component $H_z$ will be equal to zero while the tangential component $E_z$ exists at $\rho=b_0$ as described in equations (1), (2), (3):

$$E_{z1}=AJ_0(k_1b_0)e^{-j\beta z} \quad (1)$$

$$E_{z2}=[BJ_0(k_2b_0)+CY_0(k_2b_0)]e^{-j\beta z} \quad (2)$$

$$H_{\varnothing}=(-j\omega\in/k^2)(dE_z/d\rho) \quad (3)$$

At $\rho=b_0$, the tangential component should be continuous across the boundary of an interface between different material media, then: $E_{z1}=E_{z2}$ and $H_{\varnothing 1}/H_{\varnothing 2}$ where: $k_1=\omega\sqrt{\mu_0\in_0\in_e}$.

The same boundary conditions will be applied at $\rho=b_1$ and $b_2$ as described in equations (4), (5), and (6):

$$E_{z2}=[BJ_0(k_2b_1)+CY_0(k_2b_1)]e^{-j\beta z} \quad (4)$$

$$E_{z3}=[DJ_0(k_3b_1)+EY_0(k_3b_1)]e^{-j\beta z} \quad (5)$$

$$E_{z4}=[FJ_0(k_4b_2)+HY_0(k_4b_2)]e^{-j\beta z} \quad (6)$$

However, at $\rho=b_3$ the boundary will be described as in equation (7) due to the presence of the conductor around the last layer:

$$E_{z4}=[FJ_0(k_4b_3)+HY_0(k_4b_3)]e^{-j\beta z} \quad (7)$$

In the same way, the cut-off frequency of the $TE_{11}$ mode will be found given that the component of Hz exists as in equations (8), (9), and (10) at ($b_0$).

$$H_{z1}=AJ_0(k_1b_0)e^{-j\beta z} \quad (8)$$

$$H_{z2}=[BJ_0(k_2b_0)+CY_0(k_2b_0)]e^{-j\beta z} \quad (9)$$

$$E_{\varnothing}=(-j\omega\mu/k^2)(dH_z/d\rho) \quad (10)$$

The same boundary conditions will be applied at $b_1$, $b_2$, and $b_3$ as described above for the TM mode.

By arranging the seven resulting equations for each of the $TM_{11}$ and $TE_{11}$ modes, the value of the cut-off frequency of the $TM_{11}$ and $TE_{11}$ modes could be determined. This value may be found numerically using MATLAB, for example.

Various simulations are now described.

Figure 9:
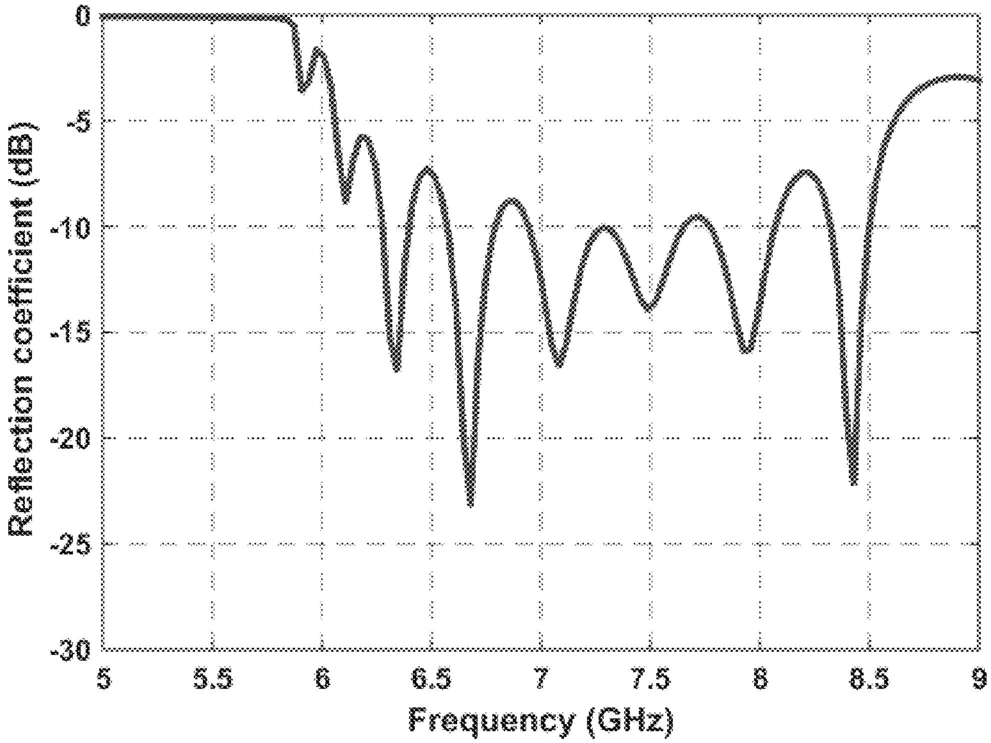
FIG. 9 is a chart of reflection coefficient vs. frequency for a multi-core dielectric circular waveguide.
Figure 10:
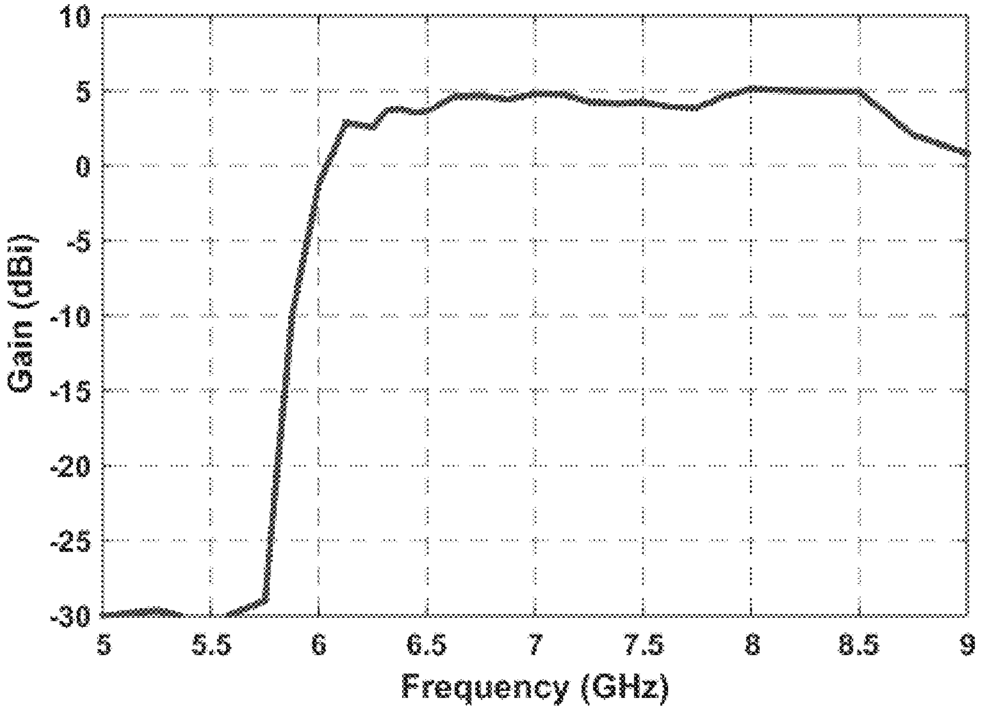
FIG. 10 is a chart of gain vs. frequency for a simulation for a multi-core dielectric circular waveguide.

In a first simulation, for a dielectric circular waveguide in hybrid mode, the reflection coefficient of the multi-core dielectric circular waveguide is plotted. FIG. 9 is a chart of reflection coefficient vs. frequency for a simulation, and FIG. 10 is a chart of gain vs. frequency for a simulation. It can be seen that the cut off frequency of the dominant mode is around 6 GHz which is before the cut off of the TE (10.6 GHz) and TM (8.2 GHz) modes. Above the cut off frequency, the gain starts to increase and is stable around 5 dBi. For more size reduction of this waveguide, the values of the dielectric constants could be increased, but this will cause some degradation in the matching. Higher relative permittivity materials reduce the frequency spacing between the hybrid mode and the TM mode.

Figure 11:
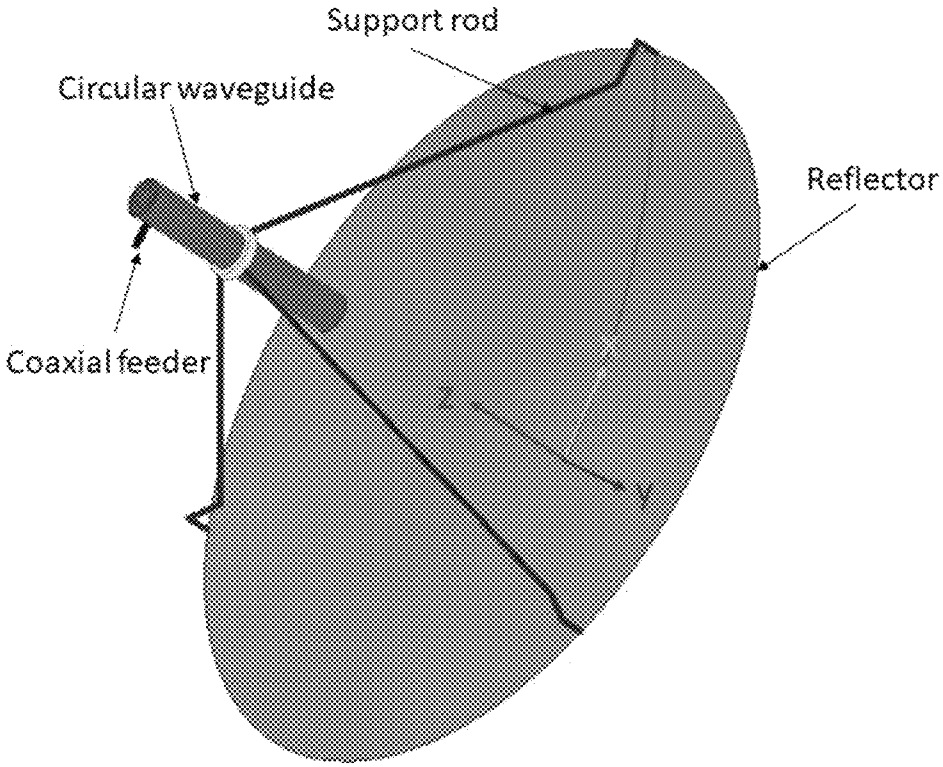
FIG. 11 is an illustration of a multi-core dielectric circular waveguide fed 1 ft reflector antenna used in a simulation.
Figure 12:
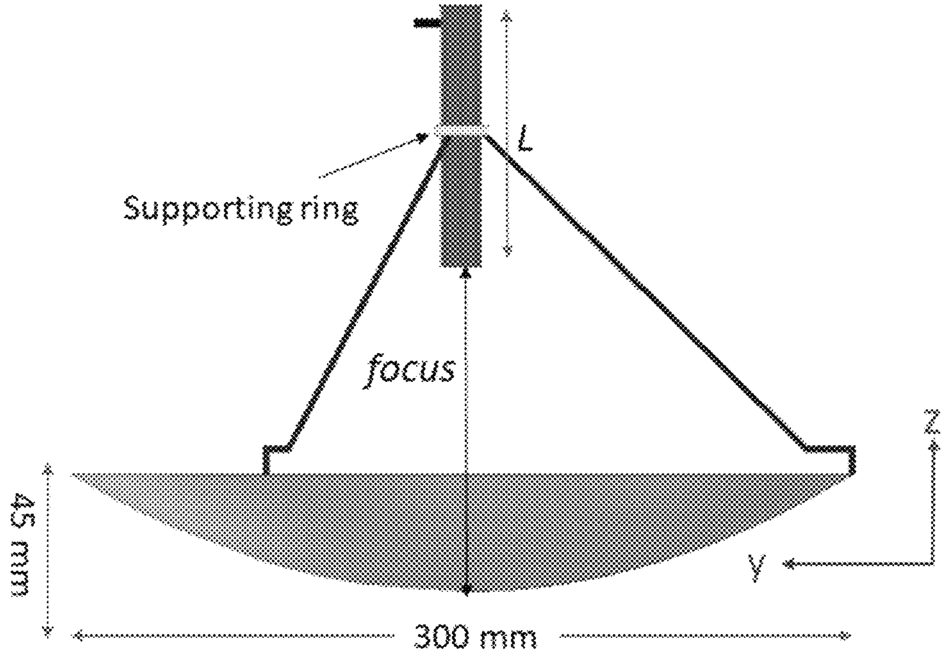
FIG. 12 is another illustration of the multi-core dielectric circular waveguide of FIG. 11.
Figure 13:
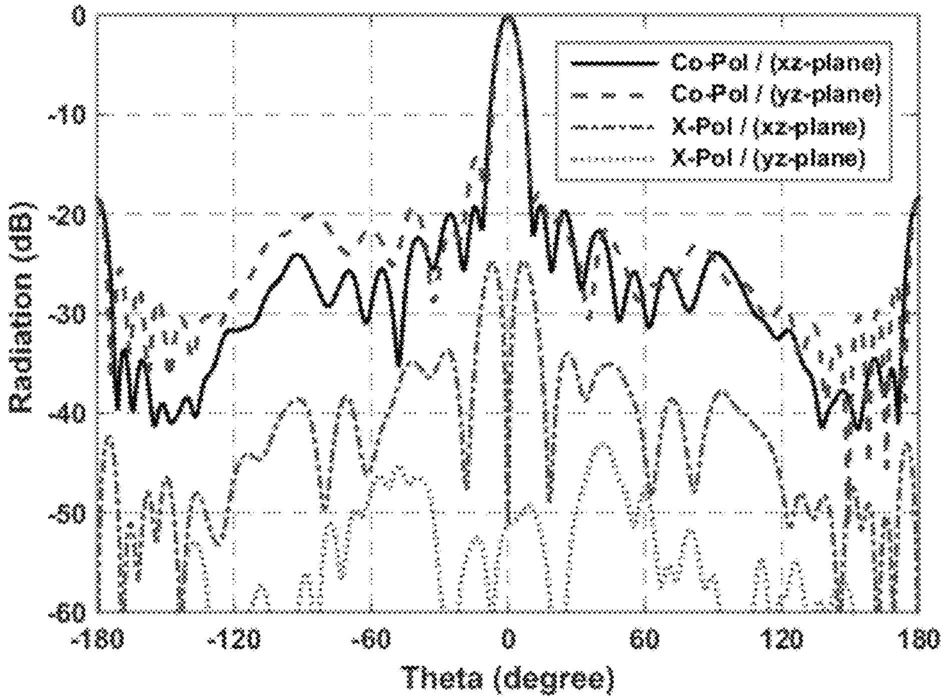
FIG. 13 is a chart of radiation vs. theta for a first frequency in a simulation.
Figure 14:
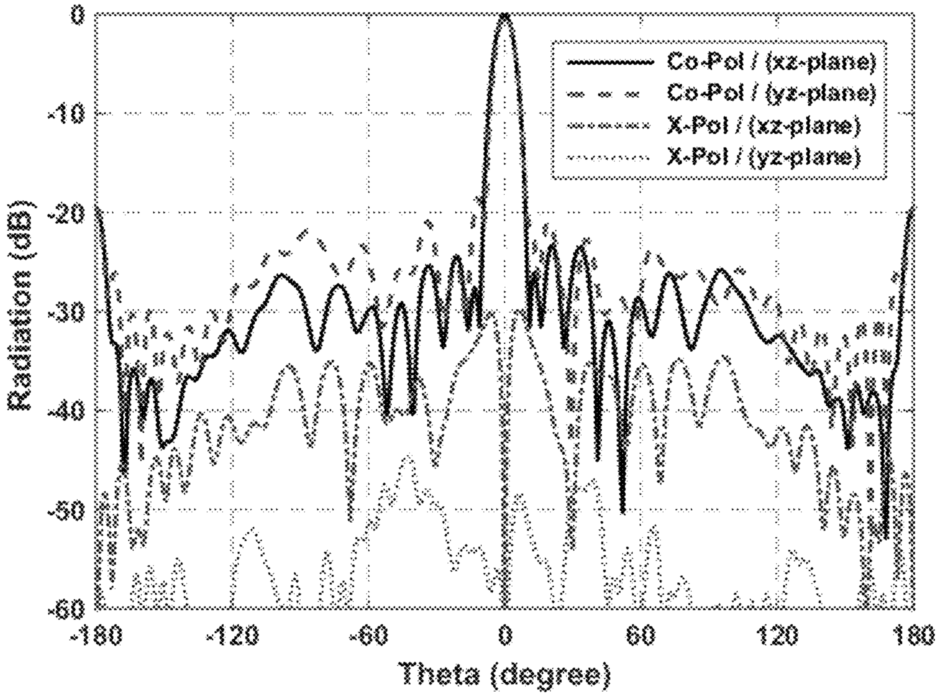
FIG. 14 is a chart of radiation vs. theta for a second frequency in a simulation.

A second simulation is described with respect to FIGS. 11-14. FIG. 11 is an illustration of a multi-core dielectric circular waveguide used in a simulation, and FIG. 12 is another illustration of the multi-core dielectric circular waveguide of FIG. 11. FIG. 13 is a chart of radiation vs. theta for a first frequency in a simulation, and FIG. 14 is a chart of radiation vs. theta for a second frequency in a simulation. In this second simulation, for a dielectric circular waveguide fed reflector antenna (1 ft), the radiation pattern performance is SLL around −20 dB, HPBW varied from 11 degrees to 7 degrees for the frequency from 6 to 8 GHz, cross polarization level of −30 dB or less, peak realized gain of 22-25 dBi through the range from 6 to 8 GHz.

Figure 15:
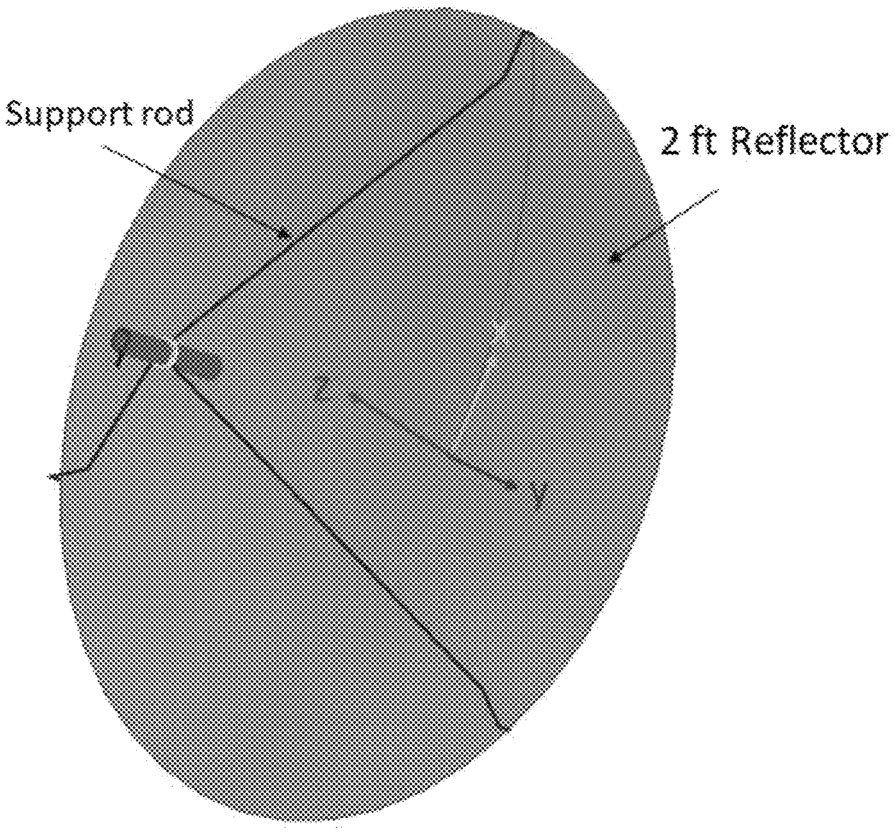
FIG. 15 is an illustration of a multi-core dielectric circular waveguide fed 2 ft reflector antenna used in another simulation.
Figure 16:
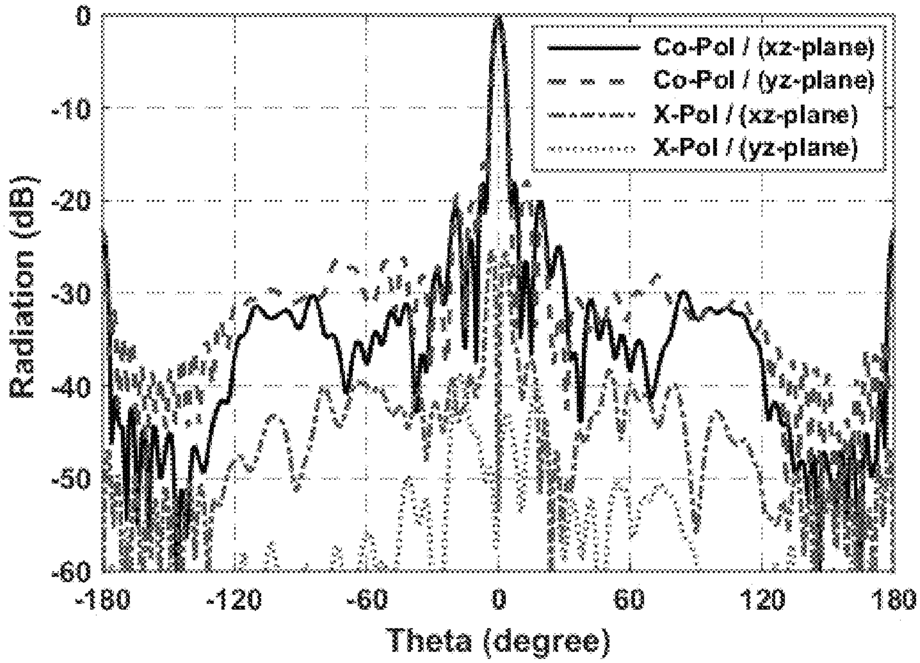
FIG. 16 is a chart of radiation vs. theta for a first frequency in another simulation.
Figure 17:
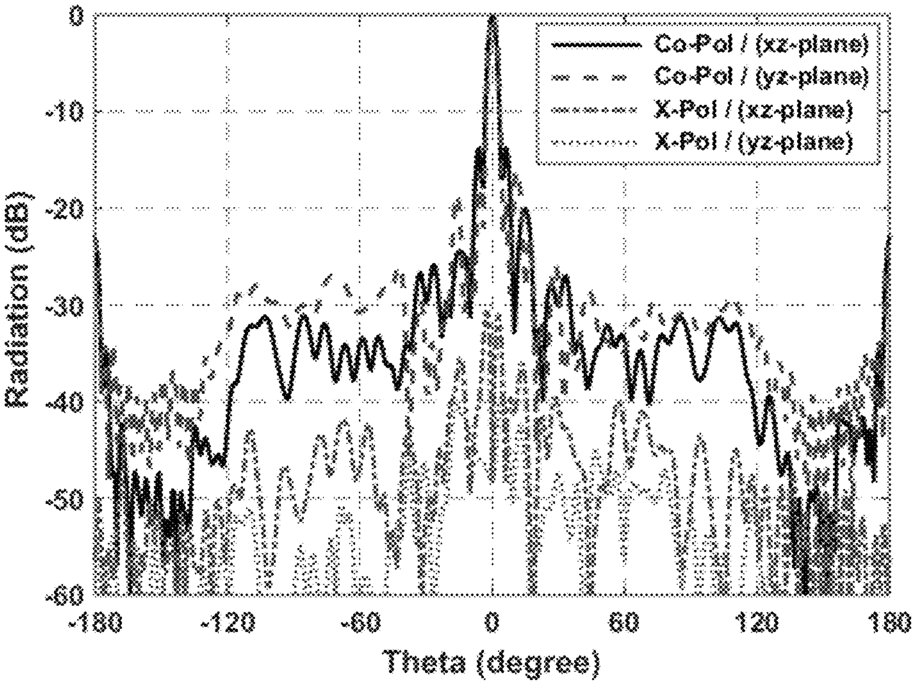
FIG. 17 is a chart of radiation vs. theta for a second frequency in another simulation.

A third simulation is described with respect to FIGS. 15-17. FIG. 15 is an illustration of a multi-core dielectric circular waveguide used in the simulation, FIG. 16 is a chart of radiation vs. theta for a first frequency in the simulation, and FIG. 17 is a chart of radiation vs. theta for a second frequency in the simulation. In this third simulation, for a dielectric circular waveguide fed reflector antenna (2 ft), the radiation pattern performance is SLL (sidelobe level) around −20 dB, HPBW varied from 3.6 degrees to 8 degrees for the frequency from 6 to 8 GHz, cross polarization level of −30 dB or less, peak realized gain of 26-29 dBi through the range from 6 to 8 GHz.

Figure 18:
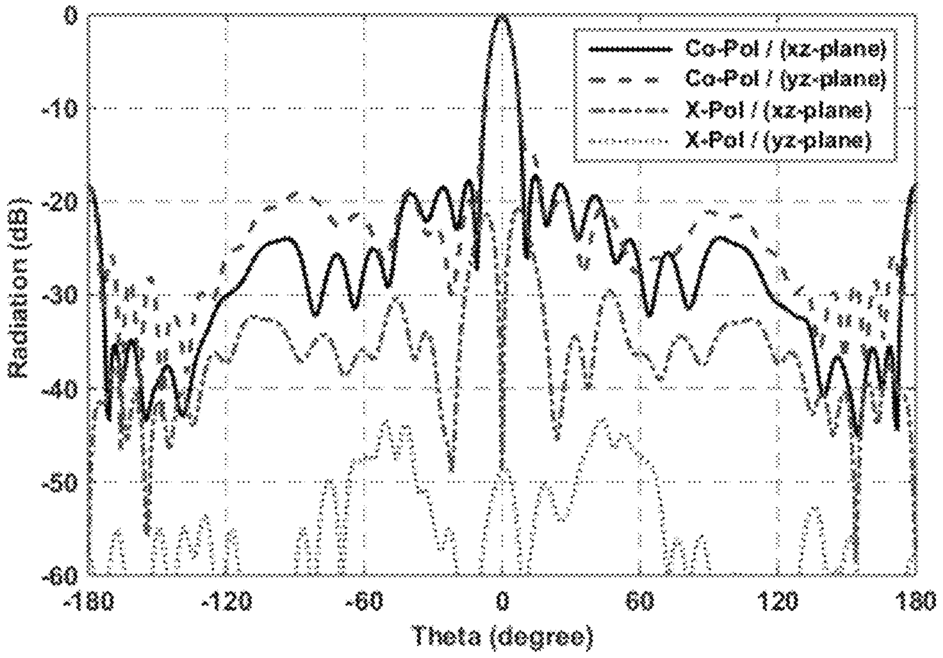
FIG. 18 is a chart of radiation vs. theta for a first frequency in another simulation.
Figure 19:
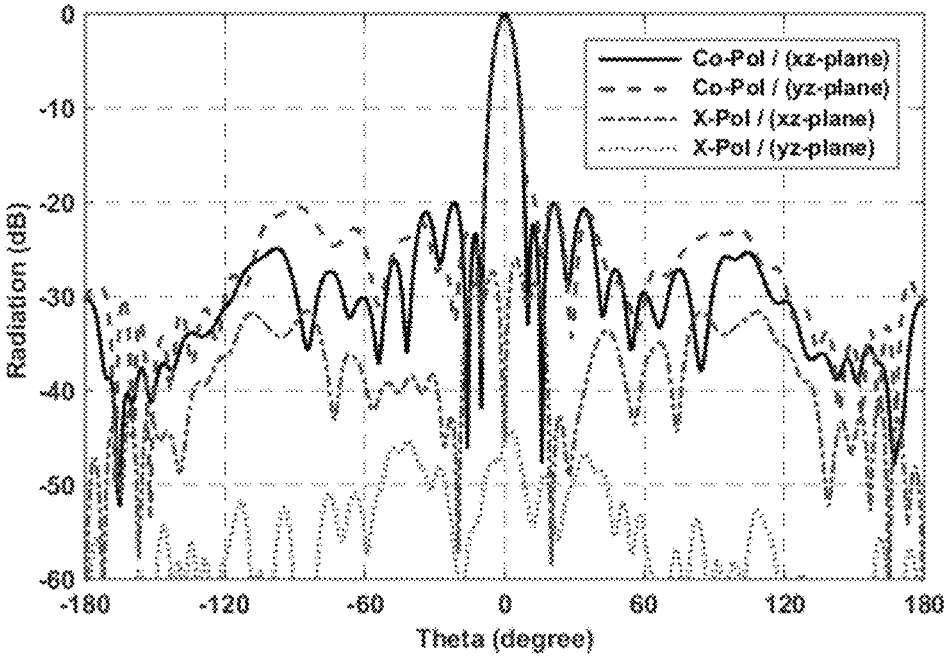
FIG. 19 is a chart of radiation vs. theta for a second frequency in another simulation.

A fourth simulation is described with respect to FIGS. 18 and 19. FIG. 18 is a chart of radiation vs. theta for a first frequency in the simulation, and FIG. 19 is a chart of radiation vs. theta for a second frequency in the simulation. In this fourth simulation, a dielectric circular waveguide fed reflector antenna (1 ft)/smaller size feeder was used. For more size reduction of the waveguide, and by following the same method, different materials are used as follows.

The materials used to simulate the first waveguide are: RT 6010 ($\in_{r3}=10.2$), TMMi with ($\in_{r3}=9.8$), Roger 6006 ($\in_{r2}=6.15$), and Roger 4350B ($\in_{r1}=3.66$). The dimensions are $b_3$, $b_2$, $b_1$ and $b_0$ which corresponds to 6, 5, 4, and 2.5 mm, respectively. The waveguide has approximately the same cut off frequency as the first one, with much smaller size. CW length is 50 mm. The gain is between 18-23 dBi, which is slightly less than the first design as the matching is degraded.

Figure 20:
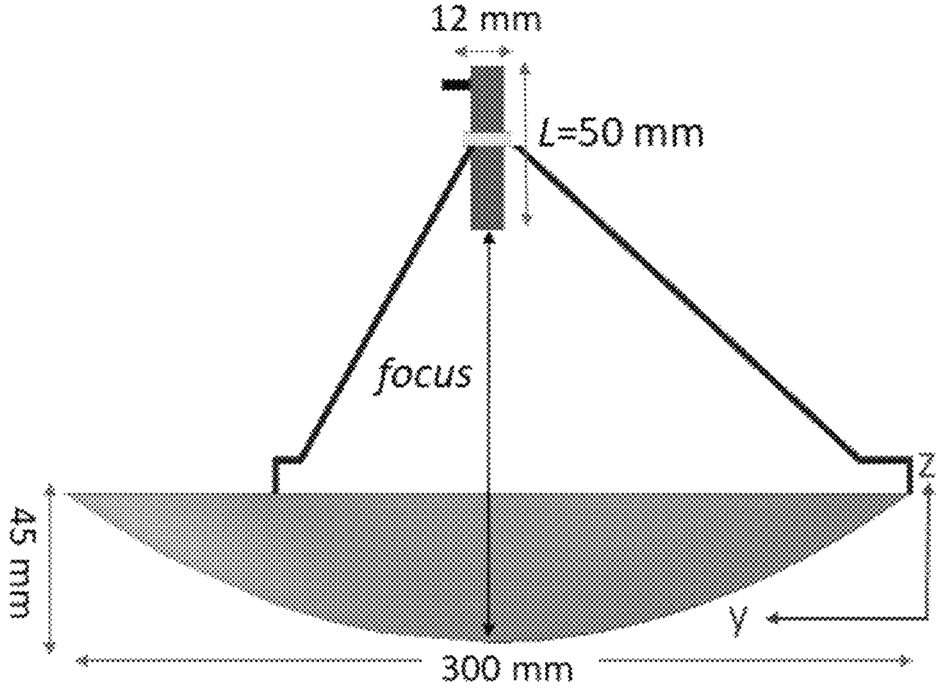
FIG. 20 is an illustration of a multi-core dielectric circular waveguide with 50 mm length used in another simulation.
Figure 21:
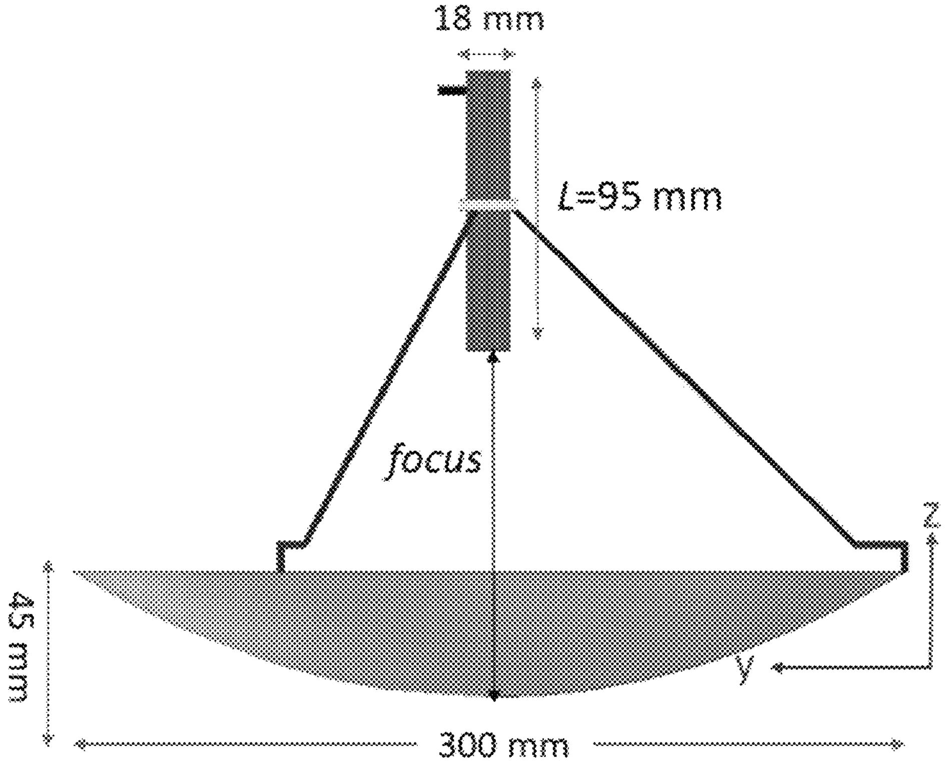
FIG. 21 is an illustration of a multi-core dielectric circular waveguide with 95 mm length used in another simulation.

A fifth simulation is described with respect to FIGS. 20 and 21. FIG. 20 is an illustration of a multi-core dielectric circular waveguide used in the simulation, and FIG. 21 is an illustration of a multi-core dielectric circular waveguide used in the simulation. In this fifth simulation, for a dielectric circular waveguide fed reflector antenna (1 ft), the feeder size could be controlled while the radiation patterns are not significantly affected. The feature will get more attractive especially for the lower frequency band at 1 GHz, where the conventional horn antenna that feeds the reflector is large and heavy. Many topological features may be applied here, such as increasing the number of dielectric layers to achieve smoother transition from higher to lower $\in_r$. High relative permittivity materials with dielectric constant up to 20 or more are being manufactured.

Figure 22:
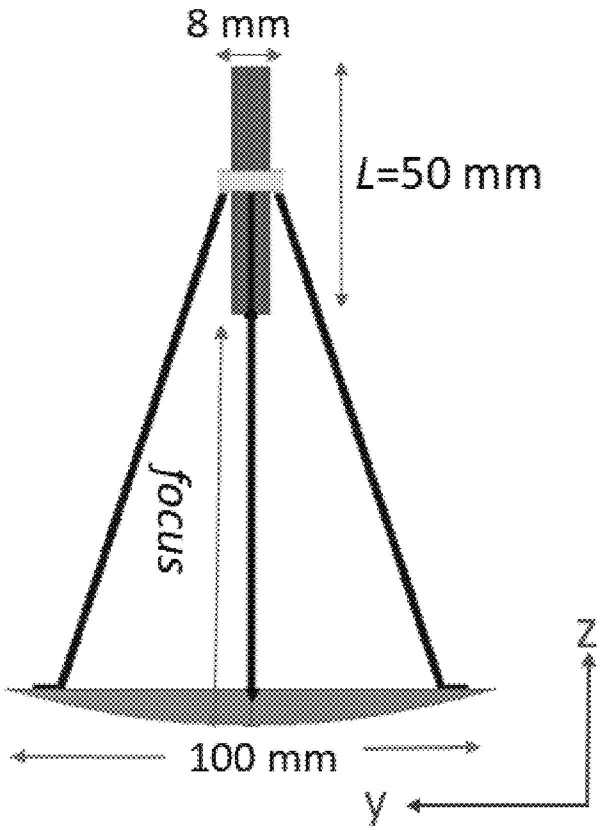
FIG. 22 is an illustration of a multi-core dielectric circular waveguide fed 4 inches diameter reflector antenna used in another simulation.
Figure 23:
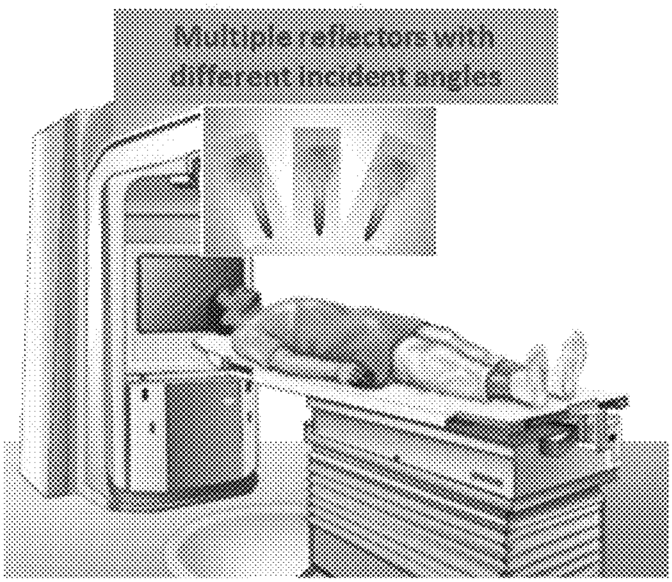
FIG. 23 is an illustration of an example implementation that uses a multi-core dielectric circular waveguide.
Figure 24:
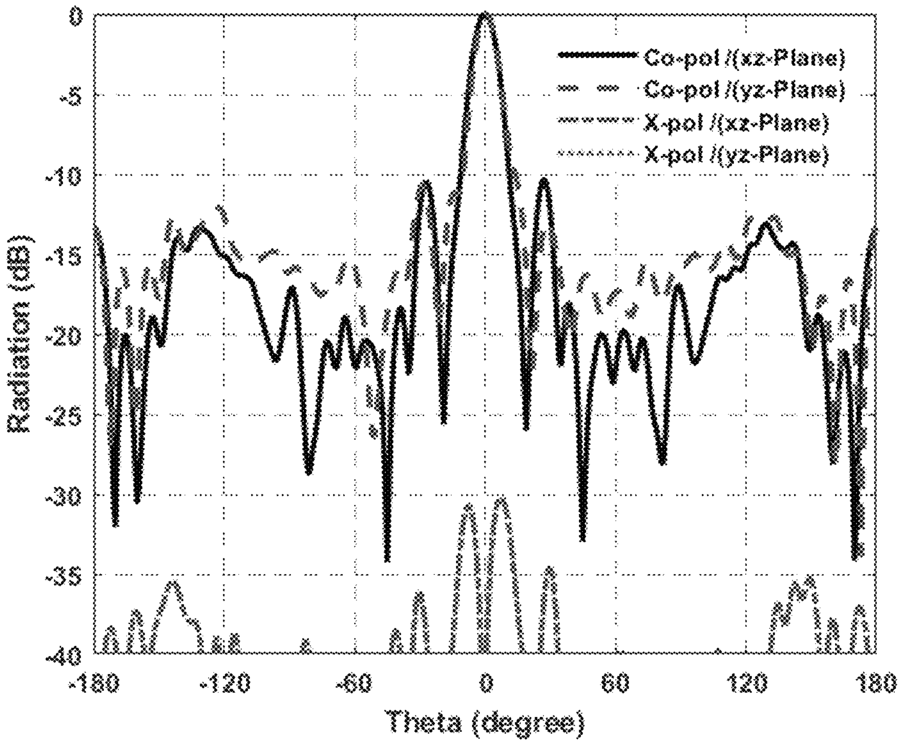
FIG. 24 is a chart of radiation vs. theta for a first frequency in another simulation.
Figure 25:
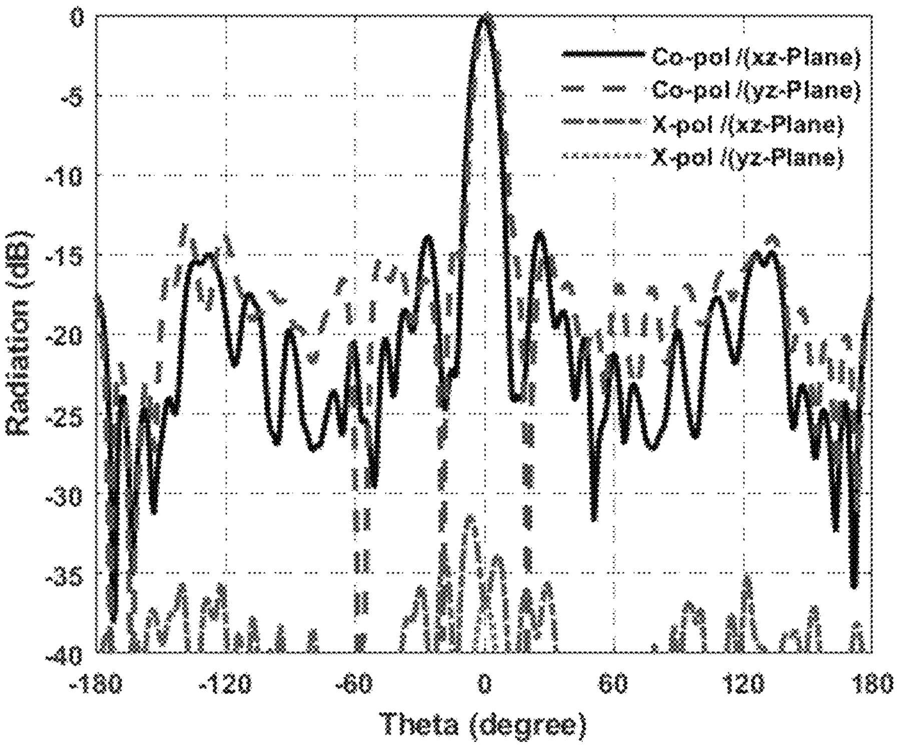
FIG. 25 is a chart of radiation vs. theta for a second frequency in another simulation.

A sixth simulation is described with respect to FIGS. 22-25. FIG. 22 is an illustration of a multi-core dielectric circular waveguide used in the simulation, FIG. 23 is an illustration of an example implementation that uses a multi-core dielectric circular waveguide, FIG. 24 is a chart of radiation vs. theta for a first frequency in the simulation, and FIG. 25 is a chart of radiation vs. theta for a second frequency in the simulation. In this sixth simulation, a dielectric circular waveguide fed reflector antenna for Ku-Band applications, the size of the reflector could be as small as 4 inches (10 cm) in diameter, while the waveguide has an outer radius of 4 mm with 5 cm length. The radiation pattern shows a narrow main beam with peak realized gain of 16-19 dBi for the band 15-18 GHz. An array of low-intensity non-ionizing radio beams produced by such miniaturized reflectors may replace the conventional multiple ion beam focusing radiotherapy equipment used for the treatment of tumors with the advantage of protecting surrounding healthy tissue in hard to reach regions of the body such as the brain.

In an implementation, a multi-core dielectric circular waveguide (MCDCW) is provided that has a first permittivity in the first layer, has a second permittivity in the second layer, has an N-th permittivity in the N-th layer, has the permittivity of the inner layer lower than the permittivity of the outer layer, and has a uniform or a variable increase rate in dielectric radius.

In an implementation, an array of multi-core dielectric circular waveguides is provided wherein there is uniform or variable spacing among the MCDCW, and comprises means to excite the MCD reflectors array in different frequency bands to support ultra-wideband applications.

In an implementation, an air-filled waveguide makes a tapered transition from MCDCW to the air-filled waveguide, has the outer surface connected to the most outer surface of MCDCW, and has the outer surface coated with a conductor.

In an implementation, a coaxial feeding method vertically extends from the center conductor of a coaxial cable and has an L-shaped center conductor of a coaxial cable.

In an implementation, a metallic feeding patch attaches to the end of the MCD reflector and excites the MCD reflector in different frequency bands to support ultra-wideband applications.

In an implementation, a MCDCW is positioned above a focal point of a metallic reflector and reduces the size of the reflector.

The multi-core dielectric-filled circular waveguide provides a significant reduction in the size of a commonly used reflector antenna for all frequency bands in areas of commercial, industrial, military, and space applications.

The designs described herein distinctively use progressive values of permittivity and multi-core cylindrical structure, and feeding geometries to minimize the bulky, heavy, expensive reflector antenna.

Advantages include significant size reduction while maintaining the similar radiation performance, wide band coverage with a single feed, easy to fabricate through three-dimensional (3D) printing, cost-effective (low cost (replacing the conventional, heavy, bulky, expensive horn antenna is a great improvement)), lightweight, easy to mount on existing reflector antennas, environmentally friendly, can be sold as a stand-alone product, and easily integrated into existing dish antennas. In addition, it can be easily operated as dual-polarized feeder.

Possible applications include satellite systems, microwave point-to-point links, radars, and high frequency medical applications (e.g., radiotherapy), for example.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A multi-core dielectric circular waveguide (MCDCW) comprising:

a plurality of layers including a core as an innermost layer and a conductor as an outermost layer, each of the plurality of layers having a respective permittivity, wherein the permittivity for each layer decreases from a highest permittivity value in the outermost layer to a lowest permittivity value in the innermost layer, wherein the plurality of layers include at least four layers including the core and the conductor, wherein each of the layers is a cylinder of different relative permittivity ($\in_r$) inside each other, and configured to generate a hybrid mode ($HE_{11}$) which is generated directly without converting $TE_{11}$ or $TM_{11}$ modes or by using a horn antenna, and wherein the hybrid mode is used as operating mode to feed a reflector antenna without using a horn-antenna.

2. The MCDCW of claim 1, wherein the layers have a uniform increase rate in dielectric radius.

3. The MCDCW of claim 1, wherein the layers have a variable increase rate in dielectric radius.

4. The MCDCW of claim 1, wherein the permittivity of each of the layers is different.

5. The MCDCW of claim 1, wherein the plurality of layers comprises at least five layers including the core and the conductor.

6. The MCDCW of claim 1, configured to generate the hybrid mode ($HE_{11}$) in any length of waveguide.

7. The MCDCW of claim 1, wherein the $HE_{11}$ mode is symmetrical, uniformly distributed, and has low cross polarization level.

8. The MCDCW of claim 1, wherein the relative permittivity of the core dielectric layer is about 2.1, a relative permittivity of a second layer of the plurality of layers is about 3.66, a relative permittivity of a third layer of the plurality of layers is about 6.15, a permittivity of a fourth layer of the plurality of layers is about 9.8, and a permittivity of the outmost layer of the MCDCW is a conductor whose relative permittivity is about 1.

9. The MCDCW of claim 1, further comprising an aperture at an end of the MCDCW to interface with a tapered transition waveguide.

10. The MCDCW of claim 1, wherein a dominant mode of the MCDCW is the hybrid mode.

11. An array comprising a plurality of multi-core dielectric circular waveguides (MCDCWs), wherein each MCDCW comprises a plurality of layers including a core as an innermost layer and a conductor as an outermost layer, each of the plurality of layers having a respective permittivity, wherein the permittivity for each layer decreases from a highest permittivity value in the outermost layer to a lowest permittivity value in the core, wherein the plurality of layers include at least four layers including the core and the conductor, wherein each of the layers is a cylinder of different relative permittivity ($\in_r$) inside each other, and configured to generate a hybrid mode ($HE_{11}$) which is generated directly without converting $TE_{11}$ or $TM_{11}$ modes or by using a horn antenna, and wherein the hybrid mode is used as operating mode to feed a reflector antenna without using a horn-antenna.

12. The array of claim 11, wherein there is uniform spacing among the MCDCWs.

13. The array of claim 11, wherein there is variable spacing among the MCDCWs.

14. The array of claim 11, further comprising means to excite the array in different frequency bands to support ultra-wideband applications.

* * * * *